US012510578B2

(12) United States Patent
da Silva

(10) Patent No.: US 12,510,578 B2
(45) Date of Patent: Dec. 30, 2025

(54) MAPPING PROBE FOR REAL-TIME SIGNAL SAMPLING AND RECOVERY FROM ENGINEERED ELECTROMAGNETIC INTERFERENCE

(71) Applicant: Government of the United States of America, as represented by the Secretary of Commerce, Gaithersburg, MD (US)

(72) Inventor: Fabio Cesar Siqueira da Silva, Westminster, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 406 days.

(21) Appl. No.: 18/107,899

(22) Filed: Feb. 9, 2023

(65) Prior Publication Data
US 2023/0194589 A1   Jun. 22, 2023

Related U.S. Application Data

(63) Continuation of application No. 16/418,202, filed on May 21, 2019, now abandoned.
(Continued)

(51) Int. Cl.
*G01R 29/08* (2006.01)
*G01R 31/00* (2006.01)

(52) U.S. Cl.
CPC ..... *G01R 29/0878* (2013.01); *G01R 29/0892* (2013.01); *G01R 31/001* (2013.01)

(58) Field of Classification Search
CPC ............ G01R 29/0892; G01R 29/0878; G01R 31/001; G01S 7/483; G01S 13/89; H04B 1/707
See application file for complete search history.

(56) References Cited

U.S. PATENT DOCUMENTS 7,986,413 B2   7/2011   Federici
8,593,157 B2   11/2013  Adams et al.
(Continued)

OTHER PUBLICATIONS

Akela, Standoff Through-the-Wall Imaging Sensor, National Institute of Justice Final Report, National Institute of Justice, 2011.
(Continued)

*Primary Examiner* — Stephanie E Bloss
(74) *Attorney, Agent, or Firm* — Office of Chief Counsel for National Institute of Standards and Technology

(57) ABSTRACT

A mapping probe provides real-time signal sampling and recovery from engineered electromagnetic interference and includes: a trigger voltage source that synchronizes transmission of primary electromagnetic waves; primary electromagnetic wave synthesizers that receive a trigger voltage signal and produce time-varying voltage signals; transmitters that receive time-varying voltage signals and synchronously transmit primary electromagnetic waves, such that the primary electromagnetic waves are subjected to scattering by a structural entity to produce scattered electromagnetic waves; receivers that receive scattered electromagnetic waves and produce receiver signals based on the scattered electromagnetic waves; a conversion stage that receives the receiver signals and the trigger voltage signal and produces converted data; and a render that receives the converted data and produces a map of the structural entity.

14 Claims, 3 Drawing Sheets

Related U.S. Application Data

(60) Provisional application No. 62/675,386, filed on May 23, 2018.

(56) References Cited

U.S. PATENT DOCUMENTS

| | | | |
|---|---|---|---|
| 10,416,286 B2 | 9/2019 | Freeman et al. | |
| 2002/0034191 A1* | 3/2002 | Shattil | H04L 27/2601 |
| | | | 370/464 |
| 2004/0065831 A1* | 4/2004 | Federici | G01S 13/887 |
| | | | 250/341.1 |
| 2004/0135992 A1* | 7/2004 | Munro | G01S 7/483 |
| | | | 356/4.01 |
| 2007/0205937 A1* | 9/2007 | Thompson | G01S 7/414 |
| | | | 342/159 |
| 2008/0156991 A1* | 7/2008 | Hu | G01N 21/3151 |
| | | | 250/341.1 |
| 2013/0161514 A1 | 6/2013 | Kukushkin et al. | |
| 2015/0361784 A1* | 12/2015 | Davis | G01N 27/82 |
| | | | 324/543 |
| 2017/0108472 A1* | 4/2017 | Fischer | G01N 29/343 |
| 2017/0281102 A1* | 10/2017 | Ken | G01N 37/005 |
| 2017/0328998 A1* | 11/2017 | Murakowski | G01S 13/36 |
| 2018/0059237 A1* | 3/2018 | Liu | G01S 13/89 |
| 2020/0134773 A1* | 4/2020 | Pinter | G01N 21/8806 |

OTHER PUBLICATIONS

Huffman, C., et al., "Through-the-wall Sensors for Law Enforement", Market Survey, National Institute of Justice, 2012.

* cited by examiner

MAPPING PROBE FOR REAL-TIME SIGNAL SAMPLING AND RECOVERY FROM ENGINEERED ELECTROMAGNETIC INTERFERENCE

CROSS REFERENCE TO RELATED APPLICATIONS

This patent application is a continuation of U.S. patent application Ser. No. 16/418,202 (filed May 21, 2019), which claims priority to U.S. Provisional Patent Application Ser. No. 62/675,386 (filed May 23, 2018), the disclosure of each of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 301-975-2573; email tpo@nist.gov; reference NIST Docket Number 18-033US1.

BRIEF DESCRIPTION

Disclosed is a mapping probe for real-time signal sampling and recovery from engineered electromagnetic interference, the mapping probe comprising: a trigger voltage source that produces a trigger voltage signal that synchronizes transmission of primary electromagnetic waves; a plurality of primary electromagnetic wave synthesizers in communication with the trigger voltage source and that: receives the trigger voltage signal from the trigger voltage source; produces time-varying voltage signals in response to receipt of the trigger voltage signal from the trigger voltage source; and communicates the time-varying voltage signals; a plurality of transmitters in communication with the primary electromagnetic wave synthesizers and that: receives the time-varying voltage signals from the primary electromagnetic wave synthesizers; and synchronously transmits the time-varying voltage signals as primary electromagnetic waves in response to receipt of the trigger voltage signal from trigger voltage source by the primary electromagnetic wave synthesizers, such that the primary electromagnetic waves are subjected to scattering by a structural entity to produce scattered electromagnetic waves from the primary electromagnetic waves; a plurality of receivers that: receives the scattered electromagnetic waves; and produces a plurality of receiver signals based on the scattered electromagnetic waves; a conversion stage in communication with the receivers and that: receives, from the receivers, the receiver signals; receives, from the trigger voltage source, the trigger voltage signal; and produces converted data from the receiver signals and the trigger voltage signal; and a render in communication with the conversion stage and that: receives, from the conversion stage, the converted data; and produces a map of the structural entity.

Disclosed is a process for mapping a structural entity with a mapping probe, the process comprising: producing, by the trigger voltage source, the trigger voltage signal synchronizing transmission of primary electromagnetic waves; receiving, by the primary electromagnetic wave synthesizers, the trigger voltage signal from the trigger voltage source; producing, by the primary electromagnetic wave synthesizers, time-varying voltage signals in response to receiving the trigger voltage signal from the trigger voltage source; communicating, by the primary electromagnetic wave synthesizers, the time-varying voltage signals; receiving, by the transmitters, the time-varying voltage signals from the primary electromagnetic wave synthesizers; synchronously transmitting, by the transmitters, the time-varying voltage signals as primary electromagnetic waves in response to receiving the trigger voltage signal from the trigger voltage source by the primary electromagnetic wave synthesizers, subjecting the primary electromagnetic waves to scattering by the structural entity; producing scattered electromagnetic waves from the primary electromagnetic waves in response to scattering the primary electromagnetic waves by the structural entity; receiving, by the receivers, the scattered electromagnetic waves; producing, by the receivers, the receiver signals based on the scattered electromagnetic waves; receiving, by the conversion stage, the receiver signals from the receivers; receiving, by the conversion stage, the trigger voltage signal from the trigger voltage source; producing, by the conversion stage, converted data from the receiver signals and the trigger voltage signal; receiving, by render, the converted data from the conversion stage; and producing the map of the structural entity from the converted data to map the structural entity.

BRIEF DESCRIPTION OF THE DRAWINGS

The following description should not be considered limiting in any way. With reference to the accompanying drawing, like elements are numbered alike.

DETAILED DESCRIPTION

A detailed description of one or more embodiments is presented herein by way of exemplification and not limitation.

It has been discovered that a mapping probe herein recovers a map of a structural entity, e.g., a three-dimensional (3D) environment such as a room, a building, a city, and the like, by illuminating the structural entity with electromagnetic radiation structured in space and time according to an excitation signal referred to as a synthesized voltage signal $216.k$ ($k=1, \ldots, n$, wherein n is an integer from 1 to a selected upper value) applied to transmitters and detecting scattered electromagnetic waves with receivers $226.j$ ($0=1, \ldots, m$, wherein m is an integer from 1 to a selected upper value). Accordingly, the mapping probe performs localization and imaging with electromagnetic wave interference in real-time. It is contemplated that transmitters and receivers can be positioned outside or around a probed environment, i.e., the structural entity. The trigger voltage signal automatically and synchronously starts transmission and acquisition. Transmitted waves, i.e., primary electromagnetic waves, are generated by synthesizers as time-varying voltage signals coupled, e.g., to an antenna or transducer. The scattered waves can be received by antennas or transducers coupled to a data acquisition system that includes, e.g., a mixer, amplifier, analog to digital converter, and the like. Received data are combined with a knowledge of the transmitted signal to produce a map, e.g., a digital representation, of the structural entity 222. Advantageously, the mapping probe overcomes technical limitations of conventional instruments that involve localization, mapping, and imaging of unknown, not line-of-sight environments such as burning or collapsed buildings that can encase an individual such as a firefighter or fire victim.

Unlike GPS localization, indoor localization and mapping involve effects such as multipath, attenuation, and delays, and transfer of large amounts of information to reconstruct a geometry of a structural entity that can overload a communication channel. Beneficially, the mapping probe can involve signal processing algorithms such as compressive sensing to overcome these technological barriers and deficiencies in conventional devices and processes. Unexpectedly, the mapping probe directly provides real-time compressive sensing indoor localization based on interference of radiofrequency signals.

Figure 1:
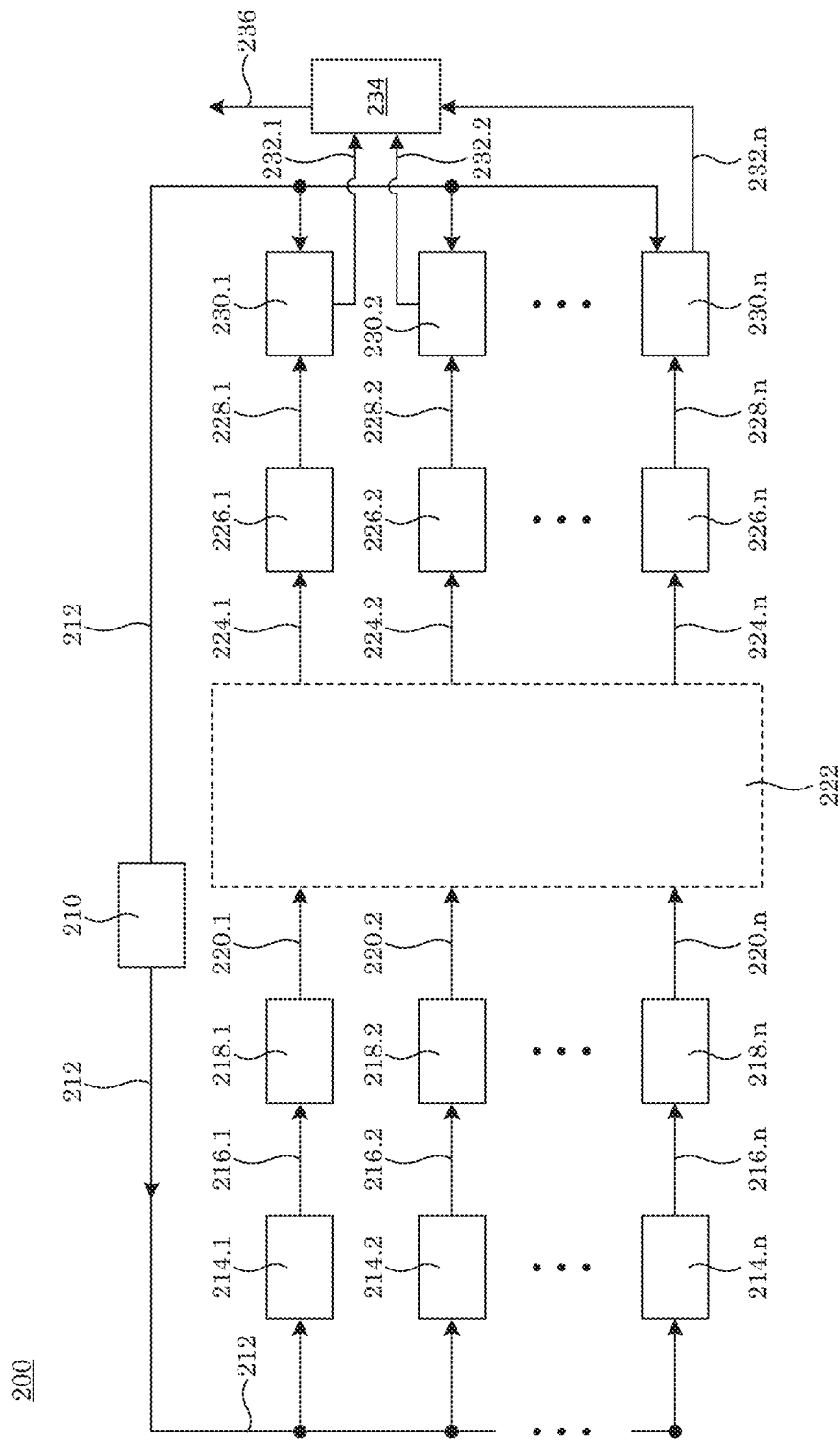
FIG. 1 shows a mapping probe.

Mapping probe 200 provides real-time signal sampling and recovery from engineered electromagnetic interference. In an embodiment, with reference to FIG. 1, mapping probe 200 includes trigger voltage source 210. Trigger voltage source 210 produces trigger voltage signal 212 that synchronizes transmission of primary electromagnetic waves 220. Primary electromagnetic wave synthesizers 214 are in communication with trigger voltage source 210. Primary electromagnetic wave synthesizers 214 receive trigger voltage signal 212 from trigger voltage source 210, produce time-varying voltage signals 216 in response to receipt of trigger voltage signal 212 from trigger voltage source 210, and communicate time-varying voltage signals 216. Mapping probe 200 also includes transmitters 218 in communication with primary electromagnetic wave synthesizers 214. Transmitters 218 receive time-varying voltage signals 216 from primary electromagnetic wave synthesizers 214 and synchronously transmit time-varying voltage signals 216 as primary electromagnetic waves 220 in response to receipt of trigger voltage signal 212 from trigger voltage source 210 by primary electromagnetic wave synthesizers 214, such that primary electromagnetic waves 220 are subjected to scattering by structural entity 222 to produce scattered electromagnetic waves 224 from primary electromagnetic waves 220. Receivers 226 receive scattered electromagnetic waves 224 and produce receiver signals 228 based on scattered electromagnetic waves 224. Conversion stage 230 is in communication with receivers 226 and receives receiver signals 228 from receivers 226, wherein conversion stage 230 receives trigger voltage signal 212 from trigger voltage source 210 and produces converted data 232 from receiver signals 228 and trigger voltage signal 212. Render 234 is in communication with conversion stage 230 and receives converted data 232 from conversion stage 230 and produces map 236 of structural entity 222.

Mapping probe 200 maps structural entity 222 from converted data 232 produced from synchronizing operation of mapping probe 200 with trigger voltage source 210. Trigger voltage source 210 can include a voltage source such as a signal generator, signal synthesizer, arbitrary waveform generator, square waveform generator, pulse generator, and the like to produce a time-varying voltage that crosses a voltage threshold (trigger voltage) either in rising or falling fashion to produce an accurate time stamp mark to initiate transmission and reception, wherein trigger voltage source 210 can provide analog or digital output. In an embodiment, trigger voltage source 210 includes a pulse generator.

Trigger voltage source 210 produces trigger voltage signal 212 for syncing production of primary electromagnetic waves 220 and acquisition of receiver signals 228. A temporal pulse rise or fall time of trigger voltage signal 212 can be less than 1 nanosecond (ns), specifically from 10 picoseconds (ps) to 100 ps. An amplitude of trigger voltage signal 212 can be from −2 volts (V) to 5 V, specifically from −1 V to 2.7 V. As used herein, "amplitude" refers to a value of voltage corresponding to a beginning or end of the rising or falling edge of the pulse. In an embodiment, trigger voltage signal 212 includes a time varying signal produced by the trigger voltage source 210 transmitted through a medium that can be a transmission line such as a coaxial cable or through free space.

Primary electromagnetic wave synthesizers 214 receives trigger voltage signal 212 and produces time-varying voltage signals 216 in response to receipt of trigger voltage signal 212. Primary electromagnetic wave synthesizers 214 can include a signal generator, signal synthesizer, arbitrary wave generator, pseudo-random binary sequence generator, vector signal generator, and the like. Exemplary primary electromagnetic wave synthesizers 214 include the pseudo-random binary sequence generator. A number of primary electromagnetic wave synthesizers 214 (e.g., 214.1, 214.2, . . . , 214.n, wherein n is an integer number of total primary electromagnetic wave synthesizers 214) can be from different pseudo-random binary sequence generators. In an embodiment, primary electromagnetic wave synthesizers 214 include pseudo-random binary sequence generators.

A temporal pulse width of time-varying voltage signals 216 can be from 1 ps to hundreds of ns depending on a selected temporal or spatial resolution. An amplitude of time-varying voltage signals 216 can be from millivolts (mV) to hundreds or thousands of volts. In an embodiment, time-varying voltage signals 216 includes time-varying voltages carried by coaxial cables or free space.

Transmitters 218 receive time-varying voltage signals 216 and produce primary electromagnetic waves 220 in response to receipt of time-varying voltage signals 216. Transmitters 218 can include an antenna or transducer that couples the voltage signal to free space such a horn antenna, Vivaldi antenna, printed circuit, omni-directional, and the like. Moreover, antennas provide bandwidth to accommodate time variations of the synthesized signal. A number of transmitters 218 (e.g., 218.1, 218.2, . . . , 218.n, wherein n is an integer number of total transmitters 218) can be from 1 to hundreds or thousands, specifically from 2 to 100, and more specifically from 12 to 32. In an embodiment, transmitters 218 include an omni-directional antenna or log-periodic antenna.

Primary electromagnetic waves 220 can have temporal pulse width that can be from 100 ps to 10 ns, specifically from 100 ps to 1 ns, and more specifically from 300 ps to 1 ns. A power of primary electromagnetic waves 220 can be from a few milliwatts (mW) to tens of kilowatts (kW).

Structural entity 222 is subjected to primary electromagnetic waves 220 from transmitters 218. Structural entity 222 can include a structure that is different from free space to scatter the electromagnetic wave. Exemplary structural entities 222 include trees and foliage, human bodies, walls, metal structures, homes, buildings, bridges, tunnels, and the like.

Structural entity 222 scatters primary electromagnetic waves 220 as scattered electromagnetic waves 224. Scattered electromagnetic waves 224 can have temporal pulse width that vary in accordance with specific details of the structural entity. This variation includes a linear combination of time varying voltages proportional to synthesized waves produced by transmitters.

Receivers 226 receive scattered electromagnetic waves 224 and produce receiver signals 228 in response to receipt of scattered electromagnetic waves 224. Receivers 226 can include an antenna (e.g., one or more) or transducer (e.g., one or more) that converts the electromagnetic wave fields into a time varying voltage. Exemplary receivers 226 include a horn antenna, omni-directional antenna, Vivaldi antenna, log-periodic antenna, combinations thereof and the like. A number of receivers 226 (e.g., 226.1, 226.2, . . . , 226.n, wherein n is an integer number of total receivers 226) can be from 1 to a selected upper number. In an embodiment, receivers 226 include an omni-directional antenna or horn antenna.

Conversion stage 230 receives receiver signals 228 and produces converted data 232 in response to receipt of receiver signals 228. Conversion stage 230 can include an amplifier, mixer, analog-to-digital converter, and the like. Exemplary conversion stage 230 includes the analog-to-digital converter. A number of conversion stage 230 (e.g., 230.1, 230.2, . . . , 230.n, wherein n is an integer number of total conversion stage 230) can be from 1 to greater than 10 to, specifically from 1 to 4.

Receiver signals 228 are time varying voltages produced by the receivers 226 and carried by transmission lines such as coaxial cables to the converters 230.

Render 234 receives converted data 232 and produces map 236 in response to receipt of converted data 232. Render 234 can include a processor that performs an algorithm such as a field programmable gate array (FPGA) or an algorithm in a computer that processes data generated in the conversion stage and outputs a map of the structural entity. Exemplary render 234 includes an L2 algorithm also referred to a least square minimizer; an L1 algorithm also referred to as compressed sensing.

Map 236 is a representation of the structural entity in a two-dimensional (2D) or three-dimensional (3D) image format that can be updated in real-time and displayed, e.g., on a monitor.

Mapping probe 200 can be made in various ways. In an embodiment, a process for making mapping probe 200 includes disposing 212 by trigger voltage source 210 in communication with primary electromagnetic wave synthesizers 214 and conversion stage 230 by connecting a pulse generator to the trigger input of the synthesizers and conversion stage; disposing primary electromagnetic wave synthesizers 214 in communication with transmitters 218 by connecting an output of the signal 216 to the transmitting antennas; disposing transmitters 218 in communication with structural entity 222 by arranging the transmitting antennas, e.g., in a straight line and positioning the antenna array at a distance from the structural entity; disposing structural entity 222 in communication with receivers 226 by arranging the receivers, e.g., in a straight line and, e.g. at a distance from the transmitting array and the structural entity; disposing receivers 226 in communication with conversion stage 230 by connecting receivers to, e.g., the analog-to-digital converter; disposing conversion stage 230 in communication with render 234 by a digital communication cable such as universal serial bus (USB) interface to the render situated as a storage memory program in a digital computer; and disposing render 234 in communication with trigger voltage source 210 by a communication cable from the computer to the pulse generator.

Mapping probe 200 has numerous advantageous and unexpected benefits and uses. In an embodiment, a process for mapping structural entity 222 with mapping probe 200 includes: producing, by trigger voltage source 210, trigger voltage signal 212 that synchronizes transmission of primary electromagnetic waves 220 and conversion stage 230; receiving, by primary electromagnetic wave synthesizers 214, trigger voltage signal 212 from trigger voltage source 210; producing, by primary electromagnetic wave synthesizers 214, time-varying voltage signals 216 in response to receiving trigger voltage signal 212 from trigger voltage source 210; communicating, by primary electromagnetic wave synthesizers 214, time-varying voltage signals 216; receiving, by transmitters 218, time-varying voltage signals 216 from primary electromagnetic wave synthesizers 214; synchronously transmitting, by transmitters 218, time-varying voltage signals 216 as primary electromagnetic waves 220 in response to receiving trigger voltage signal 212 from trigger voltage source 210 by primary electromagnetic wave synthesizers 214, subjecting primary electromagnetic waves 220 to scattering by structural entity 222; producing scattered electromagnetic waves 224 from primary electromagnetic waves 220 in response to scattering primary electromagnetic waves 220 by structural entity 222; receiving, by receivers 226, scattered electromagnetic waves 224; producing, by receivers 226, receiver signals 228 based on scattered electromagnetic waves 224; receiving, by conversion stage 230, receiver signals 228 from receivers 226; receiving, by conversion stage 230, trigger voltage signal 212 from trigger voltage source 210; producing, by conversion stage 230, converted data 232 from receiver signals 228 and trigger voltage signal 212; receiving, by render 234, converted data 232 from conversion stage 230; and producing map 236 of structural entity 222 from converted data 232 to map structural entity 222.

In the process for mapping structural entity 222, producing trigger voltage signal 212 includes launching, by pulse generator 210, pulse signal 212 that travels through the coaxial cables and synchronously starts operation of synthesizers 214 and analog-to-digital converters 230. Primary electromagnetic wave synthesizers 214 produce primary electromagnetic waves 220 that include a voltage signal in the form of a pseudo-random binary sequence that energizes transmitters 218 (e.g., an antenna) and that propagate primary electromagnetic waves 220 and which are scattered by structural entity 222. Scattered electromagnetic waves 224 arrive at receivers 226 and receiver signals 228 are converted by conversion stage 230, e.g., digital-to-analog converters. Converted data 232 (e.g., digitized information) is communicated as a digital signal to render 234 (e.g., a mapping program stored in a digital computer) and converted into map 236 (e.g., a digital image signal) that optionally can be displayed in real-time by a display such as a monitor.

In the process for mapping structural entity 222, receiving, by primary electromagnetic wave synthesizers 214, trigger voltage signal 212 from trigger voltage source 210 includes voltage signals that include rise or fall edges from −1 V to 2.7 V in a time from 10 ps to 1 ns connected to coaxial cables from the trigger voltage source 210 to the trigger input of each electromagnetic wave synthesizers 214 and the trigger input of each component of conversion stage 230.

In the process for mapping structural entity 222, producing, by primary electromagnetic wave synthesizers 214, time-varying voltage signals 216 in response to receiving trigger voltage signal 212 from trigger voltage source 210 includes voltage signals in a form of pseudo-random binary sequences that include a rising or falling edge from −1 V to 2.7 V in a time from 10 ps to 1 ns.

In the process for mapping structural entity 222, communicating, by primary electromagnetic wave synthesizers 214, time-varying voltage signals 216 includes producing voltage signals that are pseudo-random binary sequences having an amplitude from a few mV to hundreds of V peak-to-peak with each voltage transition rise and fall edges in a time from 10 ps and 1 ns and each voltage level corresponding to a binary number, 1 or 0, in a time from 100 ps to several ns.

In the process for mapping structural entity 222, receiving, by transmitters 218, time-varying voltage signals 216 from primary electromagnetic wave synthesizers 214 includes producing voltage signals that are pseudo-random binary sequences having an amplitude from a few mV to hundreds of V peak-to-peak with each voltage transition rise and fall edges in a time from 10 ps and 1 ns and each voltage level corresponding to a binary number, 1 or 0, in a time from 100 ps to several ns.

In the process for mapping structural entity 222, synchronously transmitting, by transmitters 218, time-varying voltage signals 216 as primary electromagnetic waves 220 includes producing wave disturbances that propagate in free space and mimic voltage signals that are pseudo-random binary sequences having an amplitude from a few mV to hundreds of V peak-to-peak with each voltage transition rise and fall edges in a time from 10 ps and 1 ns and each voltage level corresponding to a binary number, 1 or 0, in a time from 100 ps to several ns.

In the process for mapping structural entity 222, subjecting primary electromagnetic waves 220 to scattering by structural entity 222 includes the transmission, reflection, deflection, refraction and other forms of scattering of electromagnetic waves by media other than free space.

In the process for mapping structural entity 222, producing scattered electromagnetic waves 224 from primary electromagnetic waves 220 in response to scattering primary electromagnetic waves 220 by structural entity 222 includes producing a wave by interaction of incident electromagnetic waves 220 with the structural entity.

In the process for mapping structural entity 222, receiving, by receivers 226, scattered electromagnetic waves 224 includes detecting any wave communicated to the receiver after being scattered by the structural entity.

In the process for mapping structural entity 222, producing, by receivers 226, receiver signals 228 based on scattered electromagnetic waves 224 includes making a time varying signal that includes a linear combination of the transmitted signal modulated by the structural entity.

In the process for mapping structural entity 222, receiving, by conversion stage 230, receiver signals 228 from receivers 226 includes converting, by modules, analog signal 228 into a digital form that is processed by the render. An exemplary module is an analog-to-digital converter, a frontend amplifier, a mixer, filter, and the like.

In the process for mapping structural entity 222, receiving, by conversion stage 230, trigger voltage signal 212 from trigger voltage source 210 includes receiving voltage signals that pseudo-random binary sequences and having rise or fall edges from −1 V to 2.7 V in a time from 10 ps to 1 ns.

In the process for mapping structural entity 222, producing, by conversion stage 230, converted data 232 from receiver signals 228 and trigger voltage signal 212 includes producing numerical representations of analog signal 228 in a digital form such as 8-bit, 16-bit, 32-bit, or 64-bit integer or floating-point.

In the process for mapping structural entity 222, receiving, by render 234, converted data 232 from conversion stage 230 includes a program stored in hardware such as a field-programmable gate array (FPGA) or in a digital computer. The program contains a recovery algorithm that uses the digital signal 232 and creates a digital representation of the structural entity 236. The algorithm can use a variety of recovery techniques based on least squares (L2 minimization) or compressed sensing (L1 minimization).

In the process for mapping structural entity 222, producing map 236 of structural entity 222 from converted data 232 includes producing a 2D or 3D image to be displayed in, e.g., a digital monitor.

The process for mapping structural entity 222 also can use other computational means for the recovery algorithm in 234 such as graphics processing units (GPUs). Trigger voltage signal can be sent via coaxial cable or wirelessly via any synchronization protocol used for example in clock recovery. Transmitter 218 and receiver 228 can be mounted on mechanically rigid structures such as fire trucks or in a dynamically configurable system such as a drone.

Mapping probe 200 and processes disclosed herein have numerous beneficial uses, including fast response times (e.g., in microseconds) for real-time monitoring of movements; mapping 1D, 2D and 3D structural entities such as tunnels, individual floors, or whole buildings; tagging structural features based on recovered image contrast; using mapping probe as a metrology tool in identification and characterization of different materials; accommodating sizes of structural entities from a few centimeters to thousands of kilometers. Advantageously, mapping probe 200 overcomes limitations of technical deficiencies of conventional articles such as multiple reflection signals (multipath), long image recovery times, and dependence on prior knowledge of the structural entity. Further, this process allows for dynamic deployment in unknown scenarios and provides timely answers for mission critical activities such as search and rescue in a burning building.

Moreover, mapping probe 200 and processes herein have numerous advantageous properties. In an aspect, providing image recovery with the mapping probe can be provided via cloud service access, remote sensing, and the like.

Mapping probe 200 and processes herein unexpectedly involve small bandwidths for sensing with as few as one receiver 228 transmitting at data rates compatible with voice channels that overcomes technical limitations involved with more bandwidth intensive means such as live video feeds. Moreover, the mapping probe provides refresh rates of tens to hundreds of milliseconds for real-time updates.

Example

Real Time Signal Sampling and Recovery Using Engineered Electromagnetic Interference with a Mapping Probe.

A superposition, also referred to herein as interference, of propagating electromagnetic waves is generated by a set of transmitters to sample signals in real time. A signal can be a structural entity in a propagation medium that scatters electromagnetic waves. Data y, measured by detectors, corresponds to an inner product of a dynamically-generated interference-based sampling matrix A and signal x. Sampling occurs at a propagation speed of the waves, i.e., in real time. The signal can be sparse so that recovery occurs by aggregation and can include computational optimization, e.g., with compressive sensing.

Naturally occurring signals can be sparse so that they carry little information as provided for in compression used in digital cameras that operate in a visible band of the electromagnetic spectrum. Even though signal sparsity exists in other bands, detection thereof can be difficult and expensive. Non-invasive imaging provides sparse data, wherein a three-dimensional medium can be characterized by a small number of parameters in addition to embedded lower dimensional interfaces. Sampling of such media occurs with penetrating radiation such as radiofrequency (RF) waves, acoustic waves, infrared radiation, or x-rays. Detection at such wavelengths is difficult with a large array.

Compressed sensing is a signal recovery algorithm and technique that exploits a sparsity and inherent reciprocity between illumination and detection to make imaging in forbidden bands of the spectrum accessible. In signal analysis, a matrix $A \in R^{M \times N}$ samples signal $x \in R^N$ and retain sampling inner products in a measurement vector $y \in R^M$, i.e., $$Ax=y. \quad (1)$$

To recover x, provided M≥N, take a pseudo inverse of A and multiply it by y. This procedure becomes impractical if N is very large as in the case of discretized two- and three-dimensional spaces. If M<N, the inversion problem is ill-posed and is intractable in general. However, if x is compressible or sparse, then recovery can be achieved by computational imaging and further optimized by compressed sensing methods with a small number of measurements M such that K<M<<N, wherein K is a number of non-zero components of x in a suitable basis such as discrete cosines or wavelets where most signals of interest are compressible or sparse. To ensure recovery with a small number of measurements M c K log (N/K), a strategy is to have the sampling matrix A contain incoherent random entries following, e.g., a Gaussian or Bernoulli distribution. Computational imaging methods recover x by simple aggregation $\hat{x}=y^T A^T$, whereas compressed sensing methods search for x by minimizing $\|z\|_P$, subject to A z=y, wherein $\|z\|_p$, (0<p≤1) is an $\ell_p$ norm.

These methods involve compression at a sampling stage instead of a conventional approach to compression where the signal is sampled at full resolution by an array of detectors and subsequently compressed. This new method provides a measurement apparatus to have as few as a single detector while the illumination source retains full resolution with the corresponding computational load transferred to the recovery stage. The reversal of roles between sources and detectors overcome limitations in regions of the electromagnetic spectrum where the cost of high pixel count sensor arrays is prohibitive. It reciprocally transfers a burden of spatial resolution to the illumination system that now generates structured sampling patterns at full resolution. Furthermore, regardless of three-dimensional imaging recovery schemes at optical wavelengths, radar at radio frequencies, and ultrasound, improvements in real-time penetrating spatial reconstruction is provided by the mapping probe herein. Conventional devices involve sampling that has static patterns and lack full three-dimensional coverage.

Figure 2:
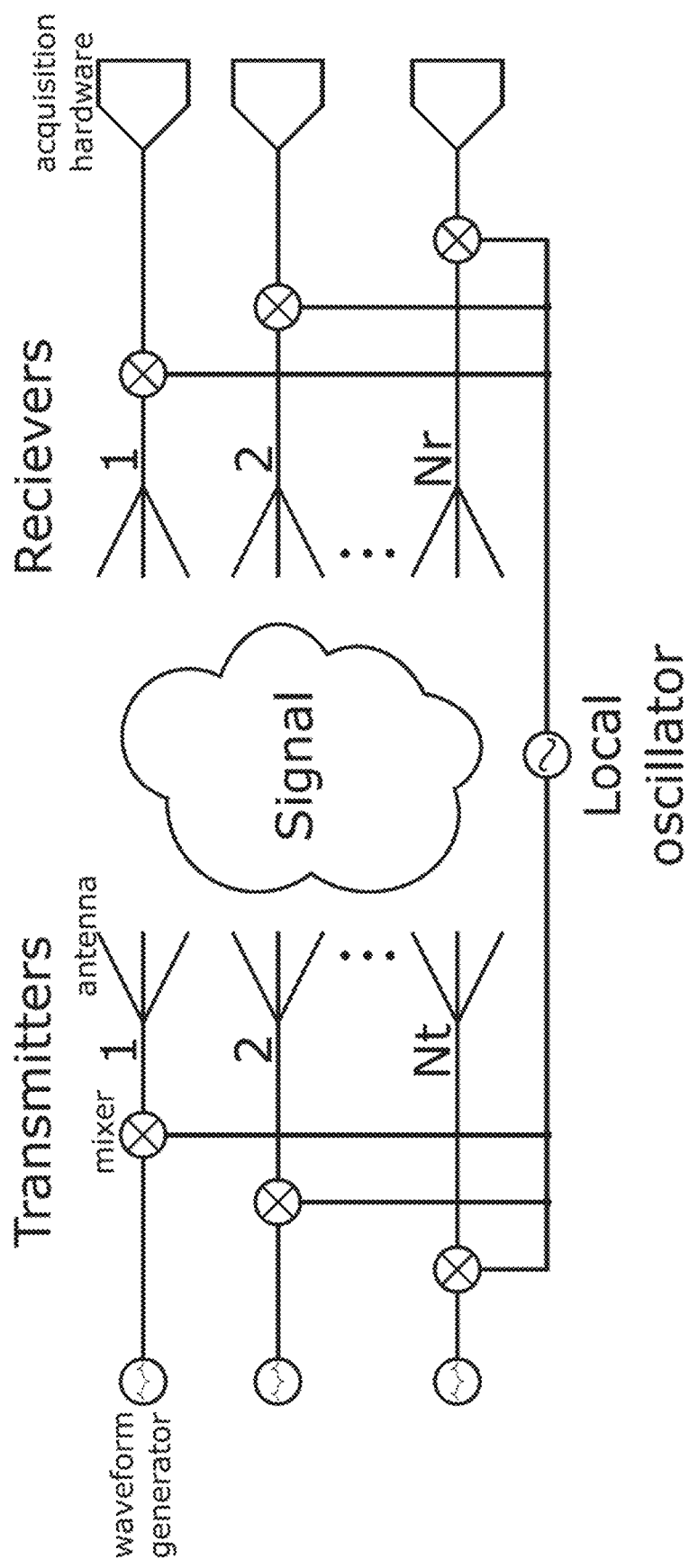
FIG. 2 shows a mapping probe.

The mapping probe, e.g., shown in FIG. 2, provides full-space three-dimensional sampling at the speed of the propagating waves in the medium by manipulating interference effects during propagation and compression of the sampling patterns that reduces a number of transmitters in the illumination system.

The mapping probe includes $N_t$ transmitters and $N_r$ receivers placed in the space where the signal is embedded, and the ensemble of transmitters, receivers, and signal are referred to as a scene. An arrangement of transmitters and receivers is arbitrary. Selection of a location occurs and provides for knowing their location; synchronizing, by a master clock, a transmission and reception process; and knowing the excitation waveforms on each transmitter.

Each transmitter independently has a waveform source connected to an antenna by a coaxial cable. The source has limited bandwidth and typically contains an oscillator connected to a quadrature-amplitude modulation stage such as an I-Q mixer. Synchronization ensures that the excitation waveforms exit the transmitters simultaneously with the start of data acquisition by the receivers.

The waveforms are tailored to produce modulations in the form of, amplitude modulation, frequency modulation, polarization modulation, or phase modulation.

Each receiver has an antenna connected to a demodulation stage, such as an I-Q mixer, by a coaxial cable. The mixer output is then digitized and stored for the recovery step.

A sampling matrix A according to Eqn. (1) is obtained and based on a model of point sources as the illumination system, a spatially dependent reflectivity function as the signal and small number of detectors. With regard to recovery of signals, to construct A in (1), a random intensity pattern is created by interference between fields formed by an array of $N_T$ transmitters driven by Dirac pulses. The pulses are amplitude modulated by pseudo-random codes of polarity ±1. We thus model each transmitter ($T_j$, j=1 ... $N_T$) as point sources placed in space-time at ($r_j''$, $t_j''$) polarized along the same direction a. The total illumination function is thus given by $E=E_j \propto E_j$, where:

$$E_j(r', t') = \sum_k C_{jk}(t_k'') \frac{\delta[c(t'-t_k'') - |r'-r_j''|]}{|r'-r_j''|} \quad (2)$$

for $t'-t_k'' \geq 0$ and zero otherwise. Upon illumination, the propagation medium, also referred to as the signal, becomes a passive source described by its reflectivity function 0≤x(r', t')≤1. The illuminating radiation samples the whole signal. Assume changes of reflectivity in time are slow enough to consider the medium stationary, i.e., x(r', t')≡x(r'). Neglect higher-order reflections from the signal. The response to the illuminating field measured at a point r and time t is thus given by:

$$y(r,t)=\int G(r,t,r',t')E(r',t')x(r')dr'|dt' \quad (3)$$

where:

$$G(r, t, r', t') = \frac{\delta[t' - (t - |r-r'|/c)]}{|r-r'|} \quad (4)$$

is the Green's function for a point source in space-time. By substituting (4) in (3) and integrating over t', we obtain:

$$y(r, t) = \int \frac{E(r', t - |r-r'|/c)}{|r-r'|} x(r')dr'. \quad (5)$$

Using (2) to replace the j-th component of E in (5) redefines the domain of integration for each source by requiring r' to satisfy the condition $t-t_j'' \leq (r'+|r'-r_j''|)/c$. This means that phase fronts arriving at the detector at a time t come from the volume inside an ellipsoid defined by:

$$r'+|r'-r_j''|=c(t-t_j'') \quad (6)$$

Figure 3:
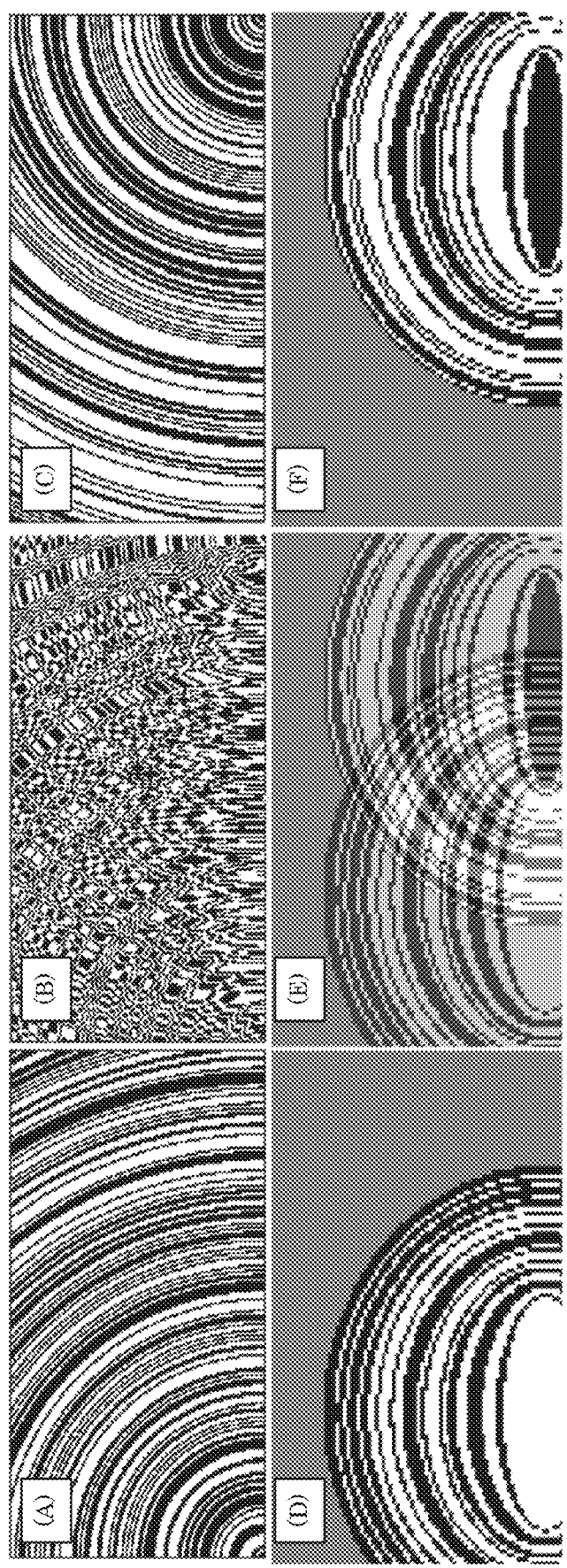
FIG. 3 shows interfering waves in panels A, B, C, D, E, and F.

If we now approximate the Diracs by gaussian pulses of duration Δt, it is obvious that each transmitter $T_j$ will have an emission pattern consisting of concentric spherical shells centered at $r_j''$ of polarity ±1 according to the corresponding pseudo-random code (FIG. 3, panels A, B, and C). The pattern sensed by the detector can be ellipsoidal shells defined by (6) as shown in FIG. 3, panels D and F. Superposition of shells coming from different transmitters and carrying their corresponding code is a randomized spatial pattern $A(r', t)=E(r', t-r'/c/|r-r'|$ that evolves in space-time (FIG. 3, panels B and E). Therefore, (5) now reads $y(r, \bar{t})= \langle A(r,r',t)|x(r')\rangle_{r'}$, i.e., the signal measured by the detector is the inner product of the random matrix $A(r,r', t)$ and the medium reflectivity function $x(r')$ during a time interval $\Delta t$ around t.

FIG. 3 shows interfering waves, wherein panels A, B, and C show patterns generated by two transmitters on the lower left and right corners of panel A and C, respectively and their interference patterns in panel B. Panels C, D, and E show the patterns shown in panels A, B, and C that are detected by a receiver disposed half-way between two transmitters. Black and white tones correspond to −1/+1 amplitude, and gray corresponds to zero amplitude.

Each pattern formed during the time $\Delta t$ around t probes $x(r')$ and returns a corresponding inner product to the detector. For microwave systems, $\Delta t$ is of the order of tens nanoseconds and uses a bandwidth $B \propto 1/\Delta t$. Moreover, because they propagate at the speed of light and can have a variable aggregated width determined by the pseudo-random codes, pattern components perform a translation or scale operation equivalent to a wavelet transform. A maximum spatial sampling resolution $\Delta r \approx c\Delta t (c=299792458$ m/s, speed of light) can be enhanced by utilizing more bandwidth, phase or quadrature amplitude modulation, polarization modulation or a combination thereof. Together with the sampled range R, the spatial resolution defines the number of pixels to be $N \approx (R/\Delta r)^3$. Compared to $N_T$, sampling of the signal undergoes a compression of the order $(1-N_T/N)$. Signal recovery involves a sampling matrix A, more specifically sequences $C_{jk}(t_k")$ that minimize a number of measurements M and recovery error.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for real-time signal sampling and recovery from engineered electromagnetic interference, the process comprising:
    constructing a sampling matrix A for sampling signals from a detector;
    driving an array of transmitters by Dirac pulses;
    forming illuminating fields by the array of transmitters in response to driving the array of transmitters;
    amplitude modulating the Dirac pulses by pseudo-random codes;
    creating a random intensity pattern from the illuminating fields formed by the array of transmitters;
    illuminating a three-dimensional medium with the random intensity pattern of the illuminating fields, such that a propagation medium of the random intensity pattern is a passive source with reflectivity function $x(r', t')$;
    detecting by a detector a reflected pattern from the three-dimensional medium, the reflected pattern produced from reflecting the random intensity pattern from the three-dimensional medium; and
    compressing sampling on the order of $(1-N_T/N)$, wherein $N_T$ is the number of transmitters, and N is the number of pixels of the detector.

2. The process of claim 1, wherein the pseudo-random codes comprise a ±1 polarity.

3. The process of claim 1, further comprising modelling each transmitter as a point source disposed in space-time and polarized along the same direction.

4. The process of claim 1, wherein a response to the illuminating field measured at a point r and time t is given by $$y(r,t)=\int G(r,t,r',t')E(r',t')x(r')dr'dt'.$$

5. The process of claim 4, wherein $$G(r, t, r', t') = \frac{\delta[t' - (t - |r - r'|/c)]}{|r - r'|}, \text{ such that.}$$

$$y(r, t) = \int \frac{E(r', t - |r - r'|/c)}{|r - r'|} x(r')dr'.$$

6. The process of claim 1, wherein phase fronts of the reflected pattern arriving at the detector at a time t come from the volume inside an ellipsoid given by $$r'+|r'-r_j"|=c(t-t_j").$$

7. The process of claim 1, wherein an emission pattern of each transmitter comprises concentric spherical shells centered at $r_j"$ of polarity ±1 and corresponds to the pseudo-random code.

8. The process of claim 7, wherein the reflected pattern detected by the detector is constrained to ellipsoidal shells.

9. The process of claim 8, wherein a superposition of shells emitted from different transmitters and carrying a corresponding pseudo-random code is a randomized spatial pattern that evolves in space-time.

10. The process of claim 9, wherein the randomized spatial pattern is $$A(r', t) = \frac{E\left(r', t - \frac{r'}{c}\right)}{|r - r'|}.$$

11. The process of claim 10, wherein the signal measured by the detector is the inner product of the random matrix A(r,r', t) and medium reflectivity function x(r') during a time interval Δt around t.

12. The process of claim 11, wherein the signal measured by the detector is $$y(r,t) = \langle A(r,r',t) | x(r') \rangle r'.$$

13. A mapping probe for real-time signal sampling and recovery from engineered electromagnetic interference, the mapping probe comprising:
a trigger voltage source that produces a trigger voltage signal that synchronizes transmission of primary electromagnetic waves;
a plurality of primary electromagnetic wave synthesizers in communication with the trigger voltage source and that:
  receives the trigger voltage signal from the trigger voltage source;
  produces time-varying voltage signals in response to receipt of the trigger voltage signal from the trigger voltage source; and
  communicates the time-varying voltage signals;
a plurality of transmitters in electrical communication with the primary electromagnetic wave synthesizers and that:
  electronically receives the time-varying voltage signals from the primary electromagnetic wave synthesizers; and
  synchronously transmits the time-varying voltage signals as primary electromagnetic waves in response to receipt of the trigger voltage signal from trigger voltage source by the primary electromagnetic wave synthesizers,
  such that the primary electromagnetic waves are subjected to scattering by a structural entity to produce scattered electromagnetic waves from the primary electromagnetic waves;
a plurality of receivers that:
  receives the scattered electromagnetic waves; and
  produces a plurality of receiver signals based on the scattered electromagnetic waves;
a conversion stage in communication with the receivers and that:
  receives, from the receivers, the receiver signals;
  receives, from the trigger voltage source, the trigger voltage signal; and
  produces converted data from the receiver signals and the trigger voltage signal; and
a render in communication with the conversion stage and that:
  receives, from the conversion stage, the converted data; and
  produces a map of the structural entity.

14. A process for mapping a structural entity with a mapping probe, the process comprising:
producing, by the trigger voltage source of mapping probe, a trigger voltage signal, the mapping probe comprising:
  a trigger voltage source that produces a trigger voltage signal that synchronizes transmission of primary electromagnetic waves;
  a plurality of primary electromagnetic wave synthesizers in communication with the trigger voltage source and that:
    receives the trigger voltage signal from the trigger voltage source;
    produces time-varying voltage signals in response to receipt of the trigger voltage signal from the trigger voltage source; and
    communicates the time-varying voltage signals;
  a plurality of transmitters in electrical communication with the primary electromagnetic wave synthesizers and that:
    electronically receives the time-varying voltage signals from the primary electromagnetic wave synthesizers; and
    synchronously transmits the time-varying voltage signals as primary electromagnetic waves in response to receipt of the trigger voltage signal from trigger voltage source by the primary electromagnetic wave synthesizers,
    such that the primary electromagnetic waves are subjected to scattering by a structural entity to produce scattered electromagnetic waves from the primary electromagnetic waves;
  a plurality of receivers that:
    receives the scattered electromagnetic waves; and
    produces a plurality of receiver signals based on the scattered electromagnetic waves;
  a conversion stage in communication with the receivers and that:
    receives, from the receivers, the receiver signals;
    receives, from the trigger voltage source, the trigger voltage signal; and
    produces converted data from the receiver signals and the trigger voltage signal; and
  a render in communication with the conversion stage and that:
    receives, from the conversion stage, the converted data; and
    produces a map of the structural entity;
synchronizing transmission of primary electromagnetic waves;
receiving, by the primary electromagnetic wave synthesizers, the trigger voltage signal from the trigger voltage source;
producing, by the primary electromagnetic wave synthesizers, time-varying voltage signals in response to receiving the trigger voltage signal from the trigger voltage source;
communicating, by the primary electromagnetic wave synthesizers, the time-varying voltage signals;
receiving, by the transmitters, the time-varying voltage signals from the primary electromagnetic wave synthesizers;
synchronously transmitting, by the transmitters, the time-varying voltage signals as primary electromagnetic waves in response to receiving the trigger voltage signal from the trigger voltage source by the primary electromagnetic wave synthesizers, subjecting the primary electromagnetic waves to scattering by the structural entity;

producing scattered electromagnetic waves from the primary electromagnetic waves in response to scattering the primary electromagnetic waves by the structural entity;

receiving, by the receivers, the scattered electromagnetic waves;

producing, by the receivers, the receiver signals based on the scattered electromagnetic waves;

receiving, by the conversion stage, the receiver signals from the receivers;

receiving, by the conversion stage, the trigger voltage signal from the trigger voltage source;

producing, by the conversion stage, converted data from the receiver signals and the trigger voltage signal;

receiving, by render, the converted data from the conversion stage; and producing the map of the structural entity from the converted data to map the structural entity.

* * * * *